Aug. 18, 1970 R. J. SCHWARTZ 3,525,047
PILE-UP DISCRIMINATION TECHNIQUE
Filed Dec. 5, 1967 2 Sheets-Sheet 1

INVENTOR.
Robert J. Schwartz
BY John P. Sinnott
ATTORNEY

United States Patent Office 3,525,047
Patented Aug. 18, 1970

3,525,047
PILE-UP DISCRIMINATION TECHNIQUE
Robert J. Schwartz, Houston, Tex., assignor to Schlumberger Technology Corporation, New York, N.Y., a corporation of Texas
Filed Dec. 5, 1967, Ser. No. 688,141
Int. Cl. H03k 5/20
U.S. Cl. 328—114     5 Claims

ABSTRACT OF THE DISCLOSURE

An illustrative embodiment of the invention identifies individual radiation detector signals that have merged into one pulse as a result of signal amplification. A circuit samples the amplitude of the pulse, and a variable amplitude wave generator responds at a specific time relative to the sample by producing a facsimile of a single amplified detector signal appropriate to the sampled pulse amplitude. A further circuit then subtracts the facsimile pulse from the amplifier pulse. If the two pulses are identical, as indicated by a negligible difference between them, the sampled pulse represents an individual detector signal and is not a "pile-up" of several amplified detector signals. If the residue is significant, however, the sampled pulse is a composite of several amplified and overlapping detector signals. This residue then enables a counting circuit register to indicate an additional detector signal or signals.

BACKGROUND OF THE INVENTION

Field of the Invention

This invention relates to radiation detection equipment and, more particularly, to methods and apparatus for identifying individual detector signals in a pulse pile-up at the output of a radiation detector amplifier.

Description of the prior art

Radiation detection equipment, for example, semi-conductor detectors and channel electron multipliers, are used in conditions that often produce detector output signals in excess of 15,000 randomly occurring "counts" in each second. These signals are relatively weak and require amplification. The random character and high rates of occurrence of these signals, moreover, necessarily produce a "pile-up," or a sequence of overlapping pulses at the amplifier unit. Usually a pile-up of this sort results in a single pulse that is composed of two or more amplified individual detector signals, each of which is indicative of a detected gama ray, neutron on other nuclear radiation.

A failure to distinguish between amplified individual detector pulses and pile-up pulses that correspond to several counts degrades the quality of the data registered by the detector, because much of the radiation intensity information is lost when groups of overlapping pulses are incorrectly identified as individual pulses.

Thus, it is an object of the invention to provide an improved pile-up discriminator.

It is still another object of the invention to provide an improved method for distinguishing several overlapping pulses in a single composite pulse.

SUMMARY

In accordance with the invention, and output pulse from a radiation detector amplifier is compared with a synthesized facsimile pulse that is substantially identical to a single amplified radiation detector signal. Should the facsimile and amplifier pulses match, it is clear that the output pulse identifies only one detector signal and is not a composite of several merged or overlapping pulses that each identify individual detector counts. If, however, there is a significant residue or difference between the facsimile pulse and the amplifier pulse, it is apparent that several amplified detector signals are piled up and are thereby concealed within the envelope of the amplifier output pulse.

More particularly, in accordance with one embodiment of the invention, the facsimile and amplifier pulse comparison is accomplished by sampling a distinguishing characteristic of the pulse appearing at the output of the radiation detector amplifier, as for example, the pulse amplitude. A wave generator responds to the sampled amplitude, or other distinguishing characteristic, to produce a substantial copy of a pulse that corresponds to one amplified nuclear event or amplifier output signal.

The amplified detector pulse also is applied to a delay circuit to provide sufficient time for the wave generator to produce the facsimile pulse. The delayed detector pulse and the facsimile pulse then are applied at about the same time to a subtraction circuit. Depending upon the magnitude of the pulse difference at the subtraction circuit output terminals, the amplified pulse is identified as a pile-up of more than one amplified detector signal or an amplified individual signal, as hereinbefore described.

If the subtraction circuit output indicates that the amplified pulse represents an individual detector signal, a pulse emitted by the pile-up discriminator circuit conditions an information processor to register one detected nuclear radiation. Should the subtraction circuit indicate a pile-up, however, the subtraction circuit output then sends a delayed trigger pulse to the information processor to indicate a second detected nuclear radiation. The delayed trigger pulse, moreover, is provided in response to the pulse resolution requirements of the information processor.

For a better understanding of the present invention, together with other and further objects thereof, reference is had to the following description taken in connection with the accompanying drawings, the scope of the invention being pointed out in the appended claims.

DESCRIPTION OF THE PREFERRED EMBODIMENTS

Figure 2:
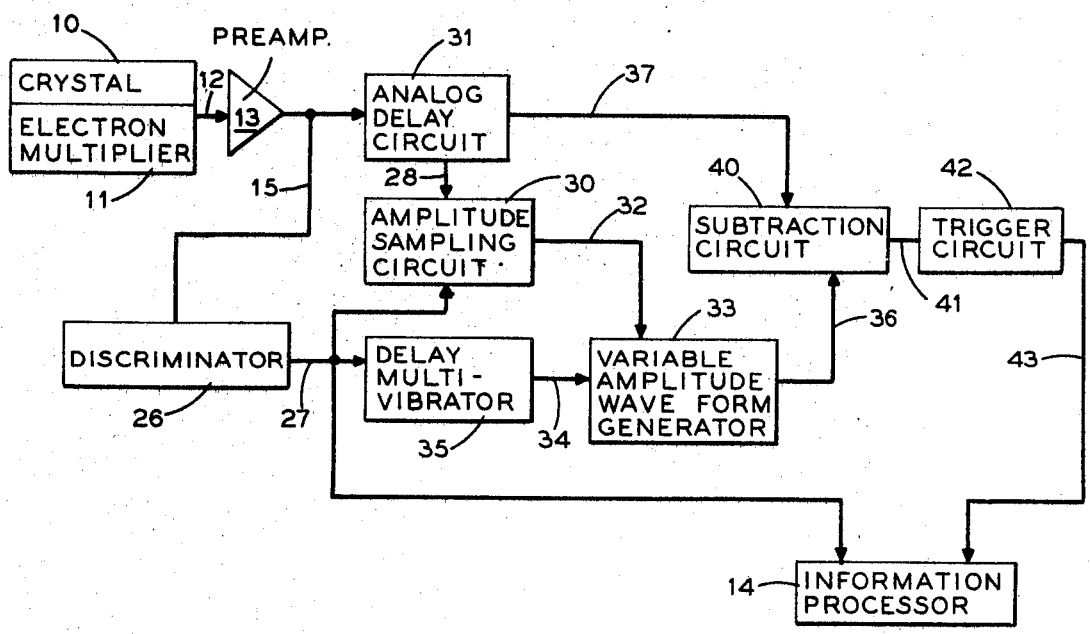
FIG. 2 is a block diagram of a typical circuit for practicing the invention.

A typical circuit in accordance with the invention is shown in FIG. 2. A scintillation crystal 10 produces a transient flash of light in response to an incident nuclear radiation. An electron multiplier 11 which may be a photomultiplier tube, or a channel electron multiplier as described in more complete detail in "The Mechanism of Channel Electron Multiplication," by J. Adams and B. W. Manley, published in IEEE Transactions on Nuclear Science, June 1966, pages 88–89, is optically coupled to the crystal 10 and responds to the flash of light within the crystal 10 by producing a charge pulse, count or detector signal in an output electrode 12 that generally is proportional to the energy of the detected radiation.

Detector signals in the multiplier output electrode 12 are transmitted to a preamplifier 13 for initial amplification and ultimate transmission to an information processor 14. The information processor 14 may be, for example, a multichannel pulse height analyzer, a count rate meter or other suitable analytical device.

Figure 1:
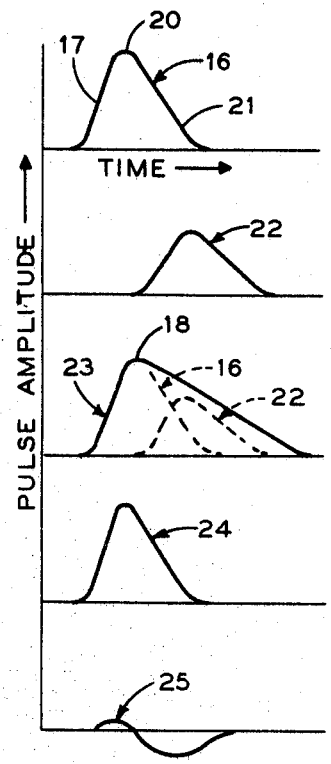
FIG. 1 shows a sequence of pulses illustrative of the principles of the invention.

A typical output pulse from the preamplifier 13 in response to one detected radiation or light scintillation in the crystal 10 is shown in FIG. 1 as the pulse 16. Usually, the amplitude of the pulse 16 provides some relative measure of the energy of the detected nuclear radiation. Thus, the leading edge of the pulse 16 comprises a relatively abrupt initial rise 17 which increases quickly to a point 20 of maximum amplitude. The trailing edge 21 of the pulse 16 then subsides or decays in a more or less exponential manner.

Illustratively, the leading edge of a subsequent amplifier pulse 22, of lower height than the pulse 16, is shown to occur within the preamplifier 13 before the trailing edge of the pulse 16 fully decays. These two pulses 16 and 22 overlap or coincide in time and thereby combine electrically in the preamplifier 13 (FIG. 2) to produce a composite preamplifier pulse 23. The pulse 23 is, in fact, the algebraic sum of the individual pulses 16 and 22, as shown in broken lines within the envelope of the composite pulse 23.

Ordinarily, in the prior art, the composite pulse 23, which also has a maximum amplitude 18 equal to the amplitude 20 of the constituent pulse 16, is sent by the preamplifier 13 through a conductor 15 (FIG. 2) to the information processor 14 where the pulse 23 is registered as a single count radiation detected by the crystal 10. In this circumstance, the information content of the second pulse 22 is lost.

In accordance with the invention, however, a facsimile pulse 24 is produced by the subsequently described circuit in response to a sampled identifying characteristic of the composite pulse 23 as, for example, the maximum pulse amplitude 20. The facsimile pulse 24 closely approximates the pulse output of the preamplifier 13 that corresponds to the detector signal for one nuclear radiation of an energy generally proportional to the observed amplitude 20 of the composite pulse 23, that is, a wave form of substantially the same shape as the pulse 16.

The facsimile pulse 24 is compared with or subtracted from the composite detector pulse 23. This comparison produces a significant residue signal 25. The residue signal 25 demonstrates that the composite pulse 23 does not conform to the wave shape characterizing one amplified detector signal, and hence must be a pile-up of two constituent pulses.

The circuit shown in FIG. 2 samples the preamplifier output, establishes the facsimile pulse and executes the pulse comparison. Thus, the composite pulse 23 (FIG. 1) in the conductor 15 is passed through a discriminator circuit 26 to filter out noise. The discriminator 26 sends an enabling or trigger pulse through a conductor 27 to the information processor 14. The pulse in the conductor 27 also is applied to an amplitude sampling circuit 30.

An analog delay circuit 31 responds to the preamplifier output pulse 23 (FIG. 1) in the conductor 15 by delaying that pulse long enough to enable the discriminator circuit 26 to operate. The pulse in the delay circuit 31 is applied through a conductor 28 to the amplitude sampling circuit 30 at the same time as the enabling pulse is received from the discriminator 26.

The amplitude sampling circuit 30 emits a pulse that corresponds to the pulse height of the amplified detector signal. The amplitude sampling circuit output pulse then is transmitted through a conductor 32 to a variable amplitude wave form generator 33. A further pulse is sent through a conductor 34 by a multivibrator 35 to the wave form generator 33. The multivibrator 35 is triggered by an appropriate pulse from the discriminator circuit 26. A delay is incorporated in the multivibrator 35 to enable the amplitude sampling circuit 30 to function before activating the generator 33.

The multivibrator and amplitude sample pulses cause the wave form generator 33 to apply an output pulse, or facsimile pulse, to a conductor 36. This generator output pulse corresponds in shape to a preamplified signal in the conductor 15 characteristic of an individually detected nuclear event. For example, the facsimile pulse 24 (FIG. 1) has substantially the same shape as the amplified detector pulse 16. In the embodiment of the invention chosen for illustrative purposes, the shape of the facsimile pulse 24 is determined by the sampled amplitude 20 of the pulse 16. Thus, once a predetermined distinguishing characteristic of the amplified detector signal is observed, the wave form of the facsimile pulse is developed to conform to the configuration of an amplified single detector pulse for comparison with the preamplifier output signal.

In accordance with the invention, the facsimile pulse in the conductor 36 and a delayed pulse in a conductor 37 that is sent from the conductor 15 and the analog circuit 31 are applied to a subtraction circuit 40. The delay circuit holds up the actual pulse for sufficient time to enable the above-described circuitry to function. The subtraction circuit 40 then strikes a difference between actual and facsimile pulses to determine if there is a residue signal 25 (FIG. 1).

A sufficiently great residue signal indicates that pulses characterizing more than one detected nuclear event are merged or piled-up in the actual pulse as, for example, in the pulse 23 (FIG. 1). A significant residue signal in a conductor 41 enables a trigger circuit 42, which then applies an output pulse through a conductor 43 to the information processor 14.

The information processor responds to the pulse in the conductor 43 by registering a "count" that ordinarily would have been lost in the composite pulse 23 (FIG. 1).

Prior to the receipt of the trigger pulse in the conductor 43, however, an initial pulse was applied to the processor 14 from the discriminator 26 through the conductor 27. The processor 14 registered this initial pulse as an individual count, thereby recording both of the amplified detector pulses 16 and 22 (FIG. 1) that were merged in the composite pulse 23.

If more than two pulses are piled up, further facsimile pulse generations and comparisons can be carried out to enhance detector circuit accuracy. For example, the residual pulse 25 can be analyzed further through a substantial duplication of the described circuits to identify the presence of other overlapping detector pulses.

As hereinbefore described, if a pile-up condition does not exist, the facsimile pulse 24 should match the delayed detector pulse 16. Accordingly, the algebraic difference between the pulses 16 and 24 produces a negligible signal in the subtraction circuit output conductor 41. In this situation, no signal is transmitted from the subtraction circuit 40 to the information processor 14. The discriminator circuit 26, however, sends a pulse through a parallel branch of the conductor 27 to the information processor 14 in order to register the one detected and preamplified pulse.

Figure 3:
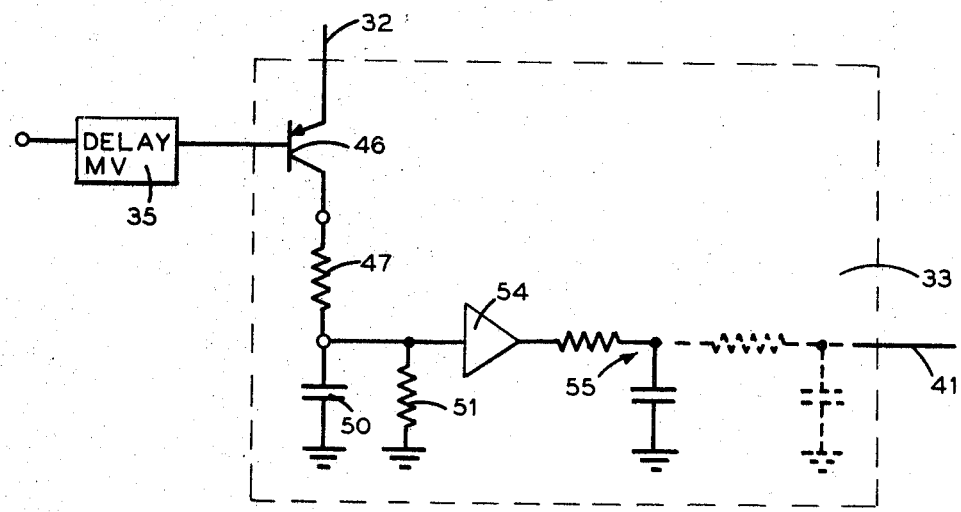
FIG. 3 is a schematic diagram of one type of variable amplitude wave generator, suitable for use in the circuit shown in FIG. 2.

One example of the variable amplitude wave generator 33 that is suitable for use with the invention is shown in FIG. 3. Accordingly, an input pulse from the triggered multivibrator 35 is sent through the conductor 34 to activate an amplifier 46 within the wave generator 33. The amplitude sample pulse in the conductor 32 also is applied to the amplifier 46. After the amplifier 46 has been activated, an output pulse is sent through a circuit that includes a resistance 47, a capacitor 50 and a resistance 51 connected in parallel with the capacitor 50.

Figure 4:
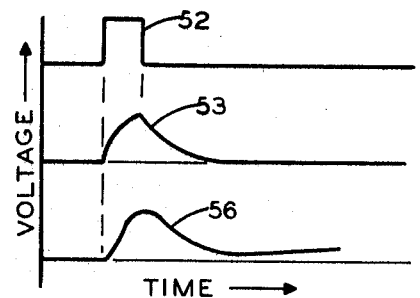
FIG. 4 shows pulses that characterize the operation of the wave generator illustrated in FIG. 3.

As shown in FIG. 4 the pulse from the multivibrator 35 is a conventional square wave 52. Between the resistor 47 and the capacitor 50, however, a more rounded pulse 53 is provided that more nearly approximates the wave form of the amplified single event pulse 16. Through successive repetitions of this process as exemplified by the amplifier 54 and resistor-capacitor combination 55, a facsimile pulse 56 (FIG. 4) is established in the wave form generator output conductor 41 that is substantially identical to the pulse 16.

The detector pulses described herein are not limited necessarily to electron multiplier signals. All radiation detector signals are suitable for processing in the described manner. For example, gas-filled counting tube and semiconductor detector signals can be used with the present invention. Pulse amplitude, moreover, need not provide the only basis for signal comparison. Pulse width, pulse rise time, and pulse area are typical of the parameters that can be used for pile-up discrimination purposes in accordance with the invention.

Although the residual pulse 25 (FIG. 1) is not an algebraic difference between the overlapping detector pulses 16 and 22, appropriate comparison or subtraction circuits can be provided to enable the amplitudes of the merged pulses 16 and 22 to be identified. Consequently, a pulse height analyzer may be connected to the subtraction circuit output conductor 41 to sort the identified pulses into separate channels according to the corresponding energies of the detected radiations.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A pulse pile-up discriminator comprising a pulse source for the discriminator, means for sampling a characteristic of a pulse from said source, signal generator means responsive to said sampled pulse characteristic for producing a facsimile pulse in accordance with said characteristic, and means for comparing said facsimile pulse with said sampled pulse to indicate if said sampled pulse is similar to said facsimile pulse.

2. A discriminator according to claim 1 wherein said comparing means comprises a subtraction circuit.

3. A discriminator according to claim 2 wherein said said subtraction circuit comprises further circuit means for indicating a pile-up when said sampled pulse is substantially different from said facsimile pulse.

4. A radiation detector pulse pile-up discriminator comprising an amplifier, a delay circuit responsive to said amplifier, a discriminator circuit responsive to signals from said amplifier for eliminating noise, a signal amplitude sampling circuit responsive to said delay and discriminator circuits, a variable amplitude wave generator coupled to said amplitude sampling and discriminator circuits for producing a facsimile radiation detector signal in response thereto, a subtraction circuit coupled to said delay circuit and said wave generator for producing another signal in response thereto, a trigger circuit responsive to said subtraction circuit signal, and an information processor controlled by said trigger circuit to register signals therefrom.

5. A method for distinguishing individual radiation detector pulses in an overlapping sequence thereof, comprising sampling a distinctive detector pulse characteristic, delaying the sequence while said distinctive characteristic is being sampled, generating a facsimile detector pulse in response to said sampled characteristic, and comparing said facsimile pulse and said delayed sequence to identify departures in said delayed sequence from said facsimile detector pulse that indicates the individual pulses in the overlapping sequence of detector pulses.

References Cited

UNITED STATES PATENTS

| | | | |
|---|---|---|---|
| 2,806,651 | 9/1957 | Fernsler | 328—115 XR |
| 2,974,231 | 3/1961 | Greenblatt et al. | 250—83.3 |
| 3,076,145 | 1/1963 | Copeland et al. | 328—147 XR |
| 3,221,165 | 11/1965 | Goodale et al. | 250—83.3 XR |

JOHN S. HEYMAN, Primary Examiner

J. ZAZWORSKY, Assistant Examiner

U.S. Cl. X.R.

307—231, 235, 268; 328—117, 147, 151